United States Patent [19]

Dayan et al.

[11] Patent Number: 5,230,052
[45] Date of Patent: Jul. 20, 1993

[54] APPARATUS AND METHOD FOR LOADING BIOS INTO A COMPUTER SYSTEM FROM A REMOTE STORAGE LOCATION

[75] Inventors: Richard A. Dayan; Robert Sachsenmaier; Simon Y. Yen, all of Boca Raton, Fla.

[73] Assignee: International Business Machines Corp., Armonk, N.Y.

[21] Appl. No.: 590,749

[22] Filed: Oct. 1, 1990

[51] Int. Cl.$^5$ .............................. G06F 13/10
[52] U.S. Cl. ........................ 395/700; 364/DIG. 1; 364/242.95; 364/280.9; 364/284.4
[58] Field of Search ... 364/200 MS File, 900 MS File; 395/700

[56] References Cited

U.S. PATENT DOCUMENTS

| | | | |
|---|---|---|---|
| 3,931,504 | 1/1976 | Jacoby | 235/153 |
| 3,996,449 | 12/1976 | Attanasio | 235/61 |
| 4,138,718 | 2/1979 | Toke et al. | 364/DIG. 1 |
| 4,446,519 | 5/1984 | Thomas | 364/300 |
| 4,491,914 | 1/1985 | Sujaku | 364/200 |
| 4,525,599 | 6/1985 | Corran | 178/22.08 |
| 4,562,306 | 12/1985 | Chou | 178/22.08 |
| 4,577,289 | 3/1986 | Comerford | 364/900 |
| 4,593,353 | 6/1986 | Pickholtz | 364/200 |
| 4,685,055 | 8/1987 | Thomas | 364/200 |
| 4,685,056 | 8/1987 | Barnsdale | 364/200 |
| 4,688,169 | 8/1987 | Joshi | 364/200 |
| 4,747,139 | 5/1988 | Taaffe | 380/44 |
| 4,748,561 | 5/1988 | Brown | 364/300 |
| 4,757,534 | 7/1988 | Matyas | 380/25 |
| 4,785,361 | 11/1988 | Brotby | 360/60 |
| 4,796,220 | 1/1989 | Wolfe | 364/900 |
| 4,817,140 | 3/1989 | Chandra | 380/4 |
| 4,935,870 | 6/1990 | Burk, Jr. et al. | 364/DIG. 1 |
| 4,972,365 | 11/1990 | Dodds et al. | 364/DIG. 2 |

OTHER PUBLICATIONS

Japanese Pupa 61-199127—and translation—"Microprogram Storing System".
Japanese Pupa 62-162140—and translation—"Computer System".
Japanese Pupa 63-254529—and translation—"Microprogram Controlling Type Data Processing System".
Japanese Pupa 63-126056—and translation—"Terminal Unit Control System".
IBM Technical Disclosure Bulletin, vol. 21, No. 2, Jul. 1978 "Preventing Unauthorized Access to Diskette Loaded Microcode".
IBM Application System/400 System Support Diagnostic Aids (vol. 1).
IBM Enterprise System Architecture 1370—Principles of Operation.

Primary Examiner—Thomas M. Heckler
Attorney, Agent, or Firm—Daniel E. McConnell

[57] ABSTRACT

This invention relates to personal computer systems and in particular to an apparatus and method for loading BIOS into a personal computer system from a remote storage location. More particularly, this invention provides a personal computer adapted for use as an economical workstation in a local area network environment (a "LAN station") with provision for loading BIOS into the LAN station from a remote memory storage where the BIOS code is maintained apart from the LAN station.

26 Claims, 4 Drawing Sheets

ROM - BIOS

APPARATUS AND METHOD FOR LOADING BIOS INTO A COMPUTER SYSTEM FROM A REMOTE STORAGE LOCATION

CROSS REFERENCE TO RELATED PATENT APPLICATIONS

The present patent application is related to a group of copending applications which concern similar computer systems and which individually claim different inventive concepts embodied in such computer systems. These related patent applications are:

(1) Application Ser. No. 398,820 filed Aug. 25, 1989 by Bealkowski et al. entitled "An Apparatus and Method for Preventing Unauthorized Access to BIOS in a Personal Computer System", now U.S. Pat. No. 5,022,077;

(2) Application Ser. No. 398,860 filed Aug. 25, 1989 by Bealkowski et al. and entitled "An Apparatus and Method for Decreasing the Memory Requirements for BIOS in a Personal Computer System", now U.S. Pat. No. 5,136,713;

(3) Application Ser. No. 398,865 filed Aug. 25, 1989, by Bealkowski et al. entitled "Initial BIOS Load for a Personal Computer System";

(4) Application Ser. No. 399,631 filed Aug. 25, 1989 by Bealkowski et al. and entitled "An Apparatus and Method for Loading BIOS from a Diskette in a Personal Computer System", abandoned; and (5) Application Ser. No. 557,334 filed Jul. 23, 1990 by Arnold et al. and entitled "An Apparatus and Method for Loading a System Reference Diskette Image from a System Partition in a Personal Computer System", now U.S. Pat. No. 5,128,995.

FIELD AND BACKGROUND OF INVENTION

This invention relates to personal computer systems and in particular to an apparatus and method for loading BIOS into a personal computer system from a remote storage location.

Personal computer systems in general and IBM personal computers in particular have attained widespread use for providing computer power to many segments of today's modern society. Personal computer systems can usually be defined as a desk top, floor standing, or portable microcomputer that consists of a system unit having a single system processor and associated volatile and non-volatile memory, a display monitor, a keyboard, one or more diskette drives, a fixed disk storage, and an optional printer. One of the distinguishing characteristics of these systems is the use of a motherboard or system planar to electrically connect these components together. These systems are designed primarily to give independent computing power to a single user and are inexpensively priced for purchase by individuals or small businesses. Examples of such personal computer systems are IBM's PERSONAL COMPUTER AT and IBM's PERSONAL SYSTEM/2 Models 25, 30, 50, 50Z, 55SX, 60, 65SX, 70 and 80.

These systems can be classified into two general families. The first family, usually referred to as Family I, uses a bus architecture exemplified by the IBM PERSONAL COMPUTER AT and other "IBM compatible" machines. The second family, referred to as Family II, uses IBM's MICROCHANNEL bus architecture exemplified by IBM's PERSONAL SYSTEM/2 Models 50 through 80. MICROCHANNEL and PERSONAL SYBTEM/2 are trademarks of International Business Machines Corporation.

Beginning with the earliest personal computer system of the Family I models, such as the IBM Personal Computer, it was recognized that software compatibility would be of utmost importance. In order to achieve this goal, an insulation layer of system resident code, also called "microcode", was established between the hardware and software. This code provided an operational interface between a user's application program/operating system to relieve the user of the concern about the characteristics of hardware devices. Eventually, the code developed into a Basic Input/Output System (BIOS), for allowing new devices to be added to the system, while insulating the application program from the peculiarities of the hardware. The importance of BIOS was immediately evident because it freed a device driver from depending on specific device hardware characteristics while providing the device driver with an intermediate interface to the device. Since BIOS was an integral part of the system and controlled the movement of data in and out of the system processor, it was resident on the system planar and was shipped to the user in non-volatile read only memory (ROM). For example, BIOS in the original IBM Personal Computer occupied 8K of ROM resident on the planar board.

As new models of the personal computer family have been introduced, BIOS has been updated and expanded to include new hardware and I/O devices. As could be expected, BIOS increased in memory size. For example, with the introduction of the IBM PERSONAL COMPUTER AT, BIOS grew to require 32K bytes of ROM.

Today, with the development of new technology, personal computer systems of the Family II models are growing even more sophisticated and are being made available to consumers more frequently. Since the technology is rapidly changing and new I/O devices are being added to the personal computer systems, modification to the BIOS has become a significant problem in the development cycle of the personal computer system.

For instance, with the introduction of the IBM PERSONAL SYSTEM/2 with MICROCHANNEL architecture, a significantly new BIOS, known as advanced BIOS, or ABIOS, was developed. However, to maintain software compatibility, BIOS from the Family I models had to be included in the Family II models. The Family I BIOS became known as Compatibility BIOS or CBIOS. In Family I machines, only 32K bytes of ROM were resident on the planar board for retaining BIOS. Family II systems have been expanded to 96K bytes of ROM. Even with the addition of ABIOS, ABIOS and CBIOS could still squeeze into 96K of ROM. However, only a small percentage of the 96K ROM area remained available for expansion. With the addition of future I/O devices, CBIOS and ABIOS will eventually run out of ROM space. Thus, new I/O technology will not be able to be easily integrated within CBIOS and ABIOS.

Due to these problems, plus a desire to make modifications in Family II BIOS as late as possible in the development cycle, it became appropriate to off load portions of BIOS from the ROM. To accomplish this, portions of BIOS were stored and loaded from a fixed disk. However, it quickly became evident that loading only from a fixed disk had some limitations. Mainly, if the disk became incapacitated, the system was unusable. Also, changes to system configuration would lead to compatibility problems between BIOS and the new system configuration. Therefore, provision has been made for loading BIOS from a direct access storage device other than the resident fixed disk.

In yet another related development, personal computers have been joined together into networks in various ways and through the use of various schemes. In some such networks, personal computers are used essentially as "dumb" terminals communicating with a powerful host computer which may be of the large size known as a mainframe and which serves to provide large databases and as the location of residence of applications programs which will manipulate data. In other network arrangements, personal computers are used as "smart" terminals which obtain application programs and sometimes data from a central file server (which may be another personal computer equipped with a direct access storage device of large capacity and capable of operating at relatively quick data recovery speeds), manipulate or receive entry of data, and return data to the file server. In still other arrangements, a group of personal computers may share among the group resources available to one or more of the systems in the network, such as peripheral devices such as printers, scanners, modems, etc. and application program or data files located on various direct access storage devices each of which is more directly associated with a single one of the resource sharing personal computers. Many such network arrangements are known as a local area network or LAN (the latter acronym being a defined term for purposes of this description).

As the use of personal computers in a LAN has increased, it has been recognized that the expense of a machine used in such an environment can be decreased by removing from such a computer system elements which are more usually found in personal computers as defined hereinabove. As a result, personal computers lacking direct access storage devices have come into use. Such an apparatus has, prior to the present invention, been provided with sufficient non-volatile memory to retain the full BIOS necessary and appropriate for use of the personal computer, such as the 96k of ROM referred to above in the discussion of the BIOS developed for use with Family II machines. However, the cost of providing such memory capability can be avoided, and a more economical machine provided for certain limited types of usage, where the necessity of providing non-volatile memory is more substantially eliminated. Prior to the present invention, there has been no solution which achieved such a result while maintaining the desirable characteristics of a "smart" LAN workstation.

The use of personal computers in local area networks may give rise to yet another area of potential impact in that any given personal computer typically is configured for certain functions which are provided, with such configuring being done at least in part as a BIOS function. With a stand alone personal computer not associated with a LAN, autoconfiguration is known and conventionally occurs as part of a start up procedure. With a computer associated with a LAN, such autoconfiguration may occur as a function of BIOS stored in the computer and accessed as part of the start up procedure. However, it may be desirable for configuration of a particular computer connected with a LAN to be automatically set by the LAN on power on for that computer.

BRIEF DESCRIPTION OF INVENTION

With the foregoing discussion in mind, it is an object of this invention to provide a personal computer particularly adapted for use as an economical workstation in a local area network environment. For purposes of this disclosure, such machines are known as "LAN stations". In realizing this object of this invention, the necessity of including non-volatile ROM memory in a LAN station is minimized by provision for loading BIOS into the LAN station from a remote memory storage where the BIOS code is maintained apart from the LAN station.

Yet a further object of this invention is to operate a station which participates in a local area network in a manner which permits recovery of BIOS from non-volatile storage remote from the station. In realizing this object of the invention, a method of operation is followed which enables the substantial reduction of non-volatile memory in a personal computer used as a LAN station.

Another object of this invention is to provide for autoconfiguration of a personal computer connected with a LAN by instructions stored in the LAN remotely from the personal computer. In realizing this object of the present invention, a LAN station computer connected with a LAN is provided by the LAN, on power up, with instructions determined by the LAN to be appropriate for setting the configuration of the LAN station to the functions provided in that station.

BRIEF DESCRIPTION OF THE DRAWINGS

Some of the objects of the invention having been stated, other objects will appear as the description proceeds, when taken in connection with the accompanying drawings, in which.

DETAILED DESCRIPTION OF INVENTION

While the present invention will be described more fully hereinafter with reference to the accompanying drawings, in which a preferred embodiment of the present invention is shown, it is to be understood at the outset of the description which follows that persons of skill in the appropriate arts may modify the invention here described while still achieving the favorable results of this invention. Accordingly, the description which follows is to be understood as being a broad, teaching disclosure directed to persons of skill in the appropriate arts, and not as limiting upon the present invention.

Figure 1:
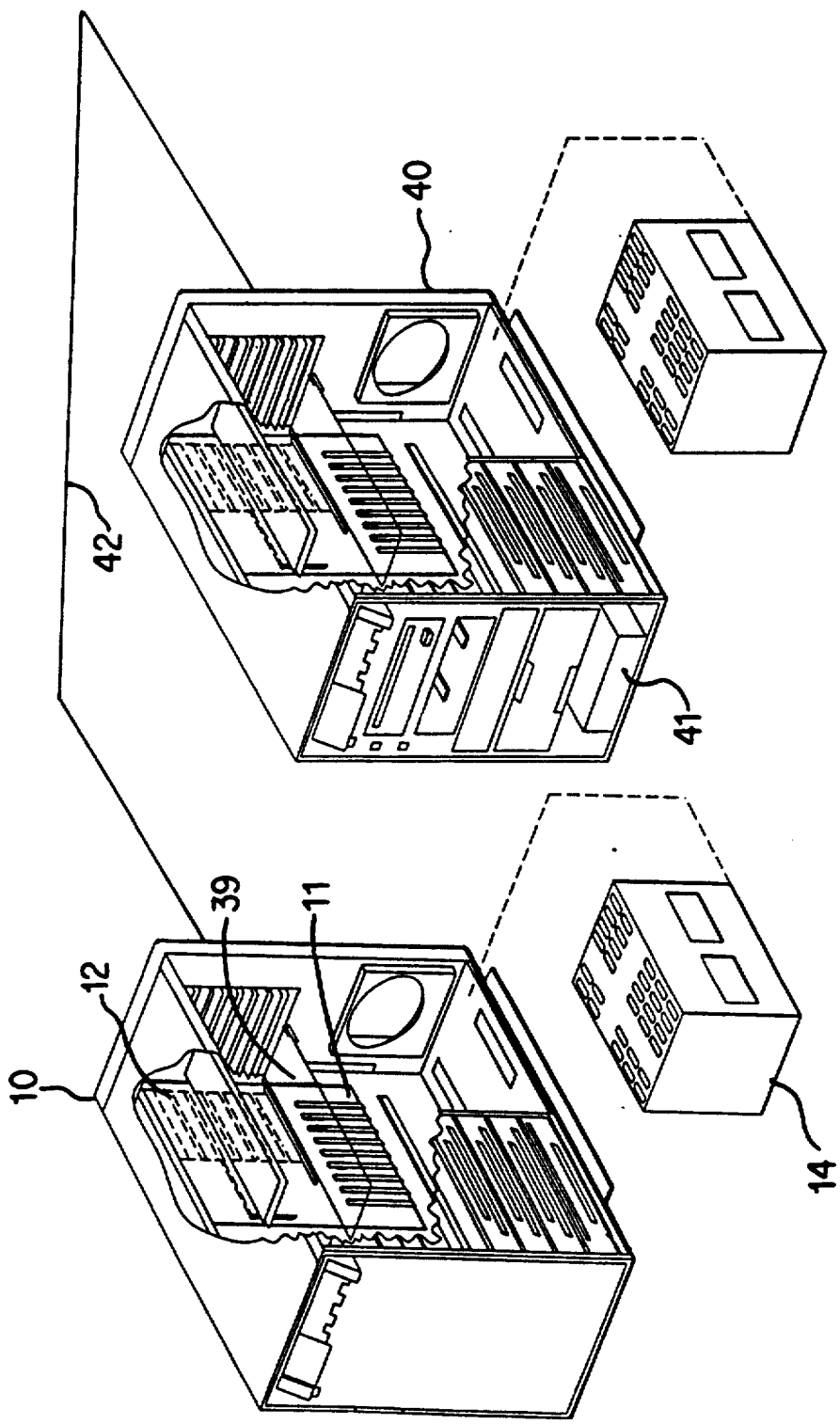
FIG. 1 illustrates a computer apparatus in accordance with this invention, including a cut away view of a LAN station personal computer system showing a system planar board.

Referring now to the drawings, and in particular to FIG. 1, there is shown a cutaway version of a personal computer system 10, having a system or planar board 11 with a plurality of I/O slots 12. A power supply 14 provides electrical power to the system 10 in a manner well known. The planar board 11 includes a system processor 15 (FIG. 2) which operates under the control of an operating system to input, process, and output information.

In use, the personal computer system 10 is designed primarily to give independent computing power to a small group of users or a single user and is inexpensively priced for purchase by individuals or small businesses. In operation, the system processor operates under the operating system, such as IBM's OS/2 operating system or PC-DOS. This type of operating system includes a BIOS interface between system processor peripherals such as a keyboard, monitor, accessory function cards, and the operating system. BIOS provides an interface between the hardware and the operating system software to enable a programmer or user to program machines without an in depth operating knowledge of a particular peripheral. For example, a BIOS disk module permits a programmer to program for DASD access without an in depth knowledge of the hardware. Thus, a number of devices designed and manufactured by different companies can be used in the system. This not only lowers the cost of the system 10, but permits a user to choose from a number of peripheral devices.

Figure 2:
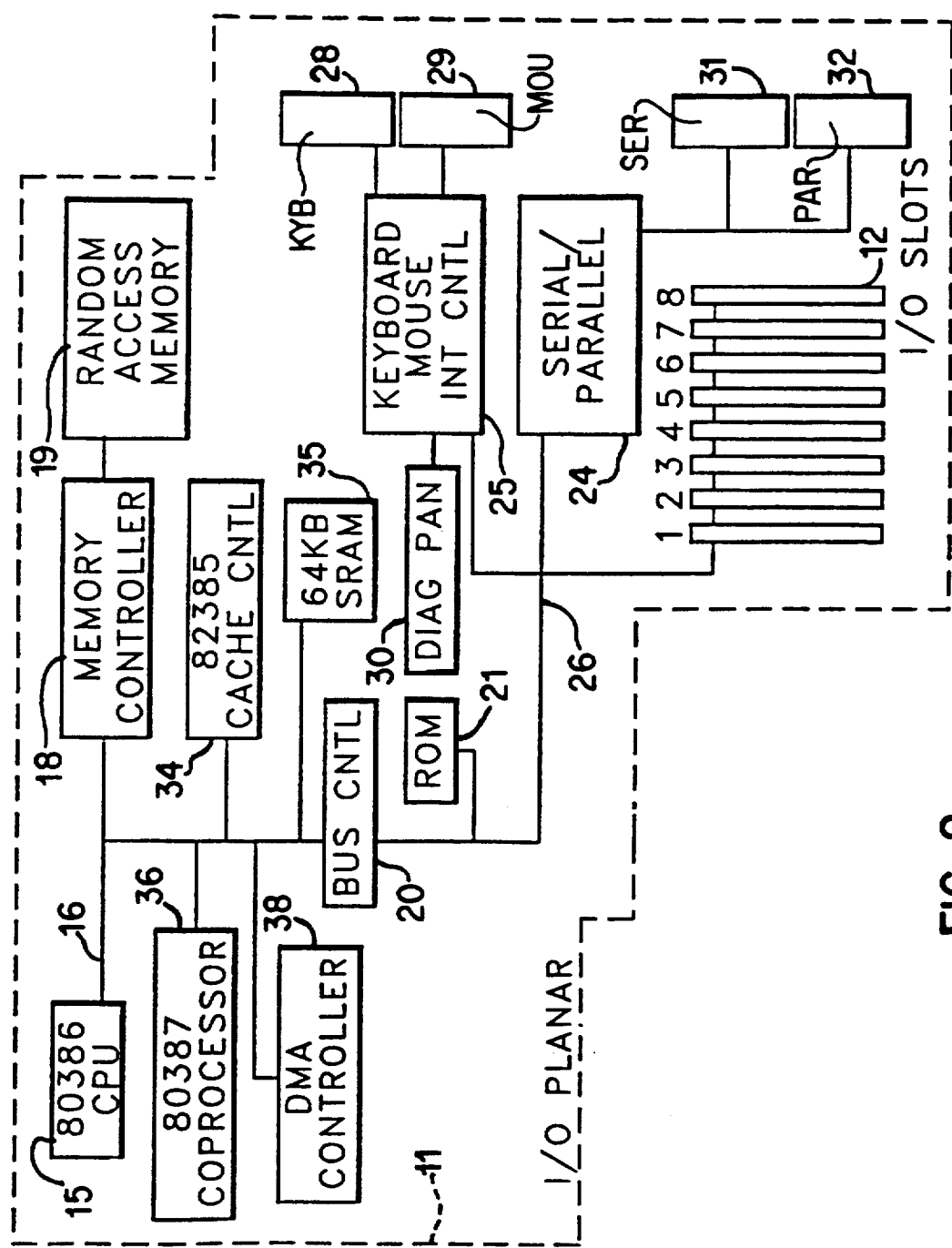
FIG. 2 shows a system block diagram for the personal computer system of FIG. 1.

Prior to relating the above structure to the present invention, a summary of the operation in general of the personal computer system 10 may merit review. Referring to FIG. 2, there is shown a block diagram of the personal computer system 10. FIG. 2 illustrates components of the planar 11 and the connection of the planar 11 to the I/O slots 12 and other hardware of the personal computer system. Located on the planar 11 is the system processor 15 comprised of a microprocessor which is connected by a local bus 16 to a memory controller 18 which is further connected to random access memory (RAM) storage devices 19. While any appropriate microprocessor can be used, one suitable microprocessor is the 80386 which is sold by Intel. The random access memory is, as will be appreciated by the knowledgeable reader, volatile in that microcode, data or the like stored in RAM is dissipated when power is removed from the computer system.

While the present invention is described here particular reference to the system block diagram of FIG. 2, it is to be understood at the outset of the description which follows, that it is contemplated that apparatus and methods in accordance with the present invention may be used with other hardware configurations of a planar board. For example, the system processor could be an Intel 80286 or 80486 microprocessor.

A planar identification number (planar ID) which is unique to the planar and identifies the type of planar being used is accessible by the system processor 15. For example, the planar ID can be hardwired to be read through an I/O port of the system processor 15.

The local bus 16 is further connected through a bus controller 20 to a non-volatile read only memory (ROM) device 21 on the planar 11. In accordance with this invention, the ROM 21 is of very limited capacity and thus relatively inexpensive. The bus controller 20 is further coupled to I/O slots 12, a serial/parallel interface 24 and peripheral controller 25 by an I/O planar bus 26. The peripheral controller 25 is further connected to a keyboard 28, mouse 29, and/or diagnostic panel 30. The serial/parallel interface 24 is further connected to a serial port 31 and parallel port 32 to input/output information to a printer or the like. As is well known in the art, the local bus 16 can also be connected to a cache controller 34, a cache memory 35, a coprocessor 36, and a DMA controller 38. Where appropriate, a network communications accessory card 39 (FIG. 1) may occupy one of the I/O slots 12.

Prior to the previously identified related inventions, ROM was provided to include all of the BIOS code which interfaced the operating system to various hardware peripherals which might be provided. According to one aspect of the present invention, however, ROM 21 is adapted to store only a minimal portion of BIOS. This portion, when executed by the system processor 15, initializes only enough of the local computer system 10 to discover the path to a remote computer system 40 (FIG. 1) and call from remote storage the BIOS appropriate for effective use of the computer system, sometimes also referred to herein as a BIOS image. This BIOS image supersedes the first BIOS portion and, being an integral part of the system, resides in main memory such as RAM 19. A benefit from loading a BIOS image from a remote storage is the ability to load BIOS directly into the system processor's RAM 19. Since accessing RAM is much faster than accessing ROM, a significant improvement in the processing speed of the computer system is achieved. The present invention contemplates that a user defined precedence list may be permitted, meaning that a user of the local computer system 10 may be able to define an ordered list of devices (such as the remote computer 40) from which the local system will attempt to procure BIOS and autoconfiguration instructions.

In order to permit reduction of the expense of ROM in the LAN station computer 10 to a minimum in accordance with this invention, the local computer is operatively associated with a remote computer 40 for performing data processing and having a system processor and storage means capable of recovery of a BIOS appropriate for effective use of the LAN station local computer system 10 from non-volatile storage of such BIOS. While not here shown or described in detail, the remote computer system 40 has components and attributes like those illustrated and described with regard to FIG. 2 and those additional elements appropriate to provide the non-volatile storage mentioned, as is known to the person skilled in the appropriate arts or may be determined from the previously mentioned related applications. The storage means associated with the remote computer 40 is a non-volatile means such as a direct access storage device (DASD) in the form of a hard disk device, CD-ROM or the like. In accordance with this invention, the local and remote computers 10, 40 are associated one with the other through some form of local area network or the like, in which effective communication may be established through electrically conductive connections, through fiber optical links, through infrared or other radiation links, or in other manners. Such a link is indicated in FIG. 1 at 41. The network may be a token-ring network, an IBM PC Network, or other known type of network. Each of the computers may be what has been defined herein as a "personal computer". Alternatively, the remote computer 40 may be some computer having capabilities other than those ascribed herein to a "personal computer", and possibly beyond those capabilities.

The operative association between the local computer 10 and the remote computer 40 may be such that the remote computer 40 functions as a file server supplying data and applications programs to the local computer; such that the remote computer functions as a resource sharer making available to the local computer such resources as may be available to the remote computer; or such that the remote computer functions as a host computer for performing at least certain data processing functions on instructions received from the local computer. While the term "remote" is used with reference to the computer system 40 through which the LAN station local computer system 10 accesses BIOS, that term is used in the sense of indicating separation, rather than in the sense of indicating a large physical distance between the systems. In fact, such systems may be physically adjacent in some network arrangements. The remote computer system 40 polls local computer systems with which it is associated (such as the local system 10 here identified) to discover requests for procurement of BIOS or setup instructions.

Turning now to the operation of the BIOS in ROM 21 and to the operation of loading the BIOS image from remote computer storage, the ROM-BIOS here disclosed will generally precheck the system and request from the remote computer storage the loading of a BIOS master boot record into RAM. The master boot record includes a data segment having validation information and a code segment having executable code. The executable code uses the data information to validate hardware compatibility and system configuration. After testing for hardware compatibility and proper system configuration, the executable code loads the BIOS image into RAM. The BIOS image succeeds ROM BIOS. It continues checking out the LAN station, completes initialization, and loads the operating system to begin operation of the machine. For purposes of clarity, the executable code segment of the master boot record will be referred to as MBR code while the data segment will be referred to as MBR data.

Figure 3:
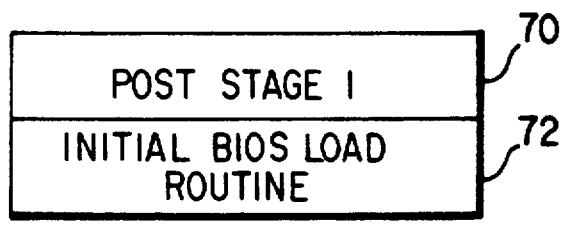
FIG. 3 is a memory map for the ROM BIOS included on the planar board of the personal computer system of FIG. 1.

FIG. 3 shows a memory map of code modules comprised in ROM-BIOS in the local computer system 10 in accordance with this invention, including a power on self test (POST) stage I module 70, and a Remote Initial BIOS Load (RIBL) Routine module 72. POST Stage I 70 performs system pre-initialization and tests. The RIBL routine 72 requests of the remote computer system 40 the loading of the BIOS image, checks compatibility and loads the master boot record.

Figure 4:
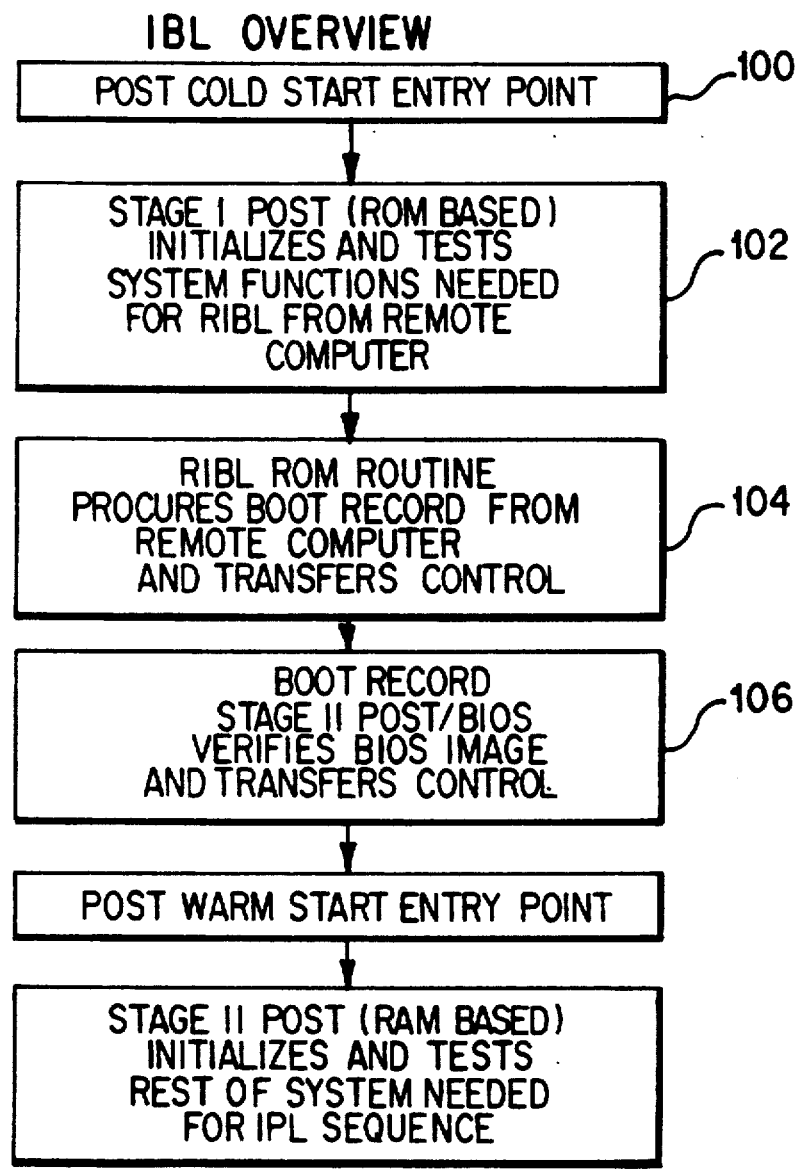
FIG. 4 is a flowchart describing the overall process for loading a BIOS image into a LAN station personal computer from a remote storage location.

FIG. 4 shows an overview of the process of loading a BIOS image into the local system 10 from remote storage. When the system is powered up or warm booted, the system processor 15 is vectored to the entry point of POST Stage I, step 100. POST Stage I initializes the system and tests only those system functions needed to load BIOS image from the selected source, step 102. In particular, POST Stage I initializes the processor/planar functions, diagnostic panel, memory subsystem, interrupt controllers, timers, and DMA subsystem, as necessary.

After POST Stage I pre-initializes the system, POST Stage I vectors the system processor to the Remote Initial BIOS Load (RIBL) routine included in the Initial BIOS Load module 72. The RIBL routine selects the remote source for loading the BIOS image and transmits a request for procurement of BIOS. Included in the requesting message are a network name for the requesting station, the name of the remote system from which BIOS is to be procured, and, optionally, a security validation code. The remote system validates the request and, if the local station is deemed appropriate for reception of BIOS, determines the configuration needed, builds the appropriate BIOS including a master boot record, and transmits first a message indicating the size and load and execute addresses for the BIOS to follow and then the BIOS image, step 104. The master boot record includes MBR data and MBR code. The MBR data is used for verification purposes and the MBR code is executed to load in the BIOS image. The data transmitted from the remote computer system 40 is stored in the RAM memory of the local computer system 10.

After the RIBL routine procures the master boot record, the system processor of the local computer system. 10 is vectored to the starting address of the MBR code to begin execution, step 106. The MBR code performs a series of validity tests to determine the authenticity of the BIOS image and to verify the configuration of the system. For a better understanding of the operation of the MBR code, attention is directed to the previously mentioned co-pending applications, to which the interested reader is directed. The present invention contemplates that the master boot record is effective for recognizing the configuration of the local computer system and for invoking delivery from the remote computer system of a program setting the configuration of the local computer system if appropriate. As specified elsewhere in this description, the master boot record also functions for calling for configuration and transfer of an image of a remaining portion of BIOS from the remote computer system into volatile memory of the local computer system and for transferring control of the local computer system thereto.

On the basis of these validity tests, the MBR code procures the transfer of the BIOS image into RAM and transfers control to the newly loaded BIOS image in main memory. In particular, the BIOS image is loaded into the RAM address space previously occupied by ROM-BIOS. That is, for example, if ROM BIOS is addressed from E0000H through FFFFFH, then the BIOS image is loaded into this RAM address space, thus superseding ROM-BIOS. Control is then transferred to POST Stage II which is included in the newly loaded BIOS image thus abandoning ROM-BIOS. POST Stage II, now in RAM, initializes and tests the remaining system in order to load the operating system boot. After the system is initialized and tested, Stage II POST transfers control to the operating system boot to load the operating system.

The detailed operation of the RIBL routine may be generally as disclosed in the previously identified related applications, and is thus not disclosed in full detail here.

In the drawings and specifications there has been set forth a preferred embodiment of the invention and, although specific terms are used, the description thus given uses terminology in a generic and descriptive sense only and not for purposes of limitation.

What is claimed is:

1. Computer apparatus for loading BIOS appropriate for effective use of a local computer system into volatile memory of the local computer system and comprising:
   a first portion of BIOS resident in non-volatile memory in the local computer system and effective for responding to the energization of the local computer system by initiating a power on self test,
   a master boot record for the local computer system resident in non-volatile memory in a remote computer system and having an executable code segment, and
   a remaining portion of BIOS appropriate for effective use of the local computer system and resident in non-volatile memory in the remote computer system, said first portion of BIOS being effective on completion of the power on self test for calling for a transfer of said boot record from the remote computer system into volatile memory of the local computer system and for transferring control of the local computer system to the boot record, and said boot record being effective for calling for a transfer of said remaining portion of BIOS from the remote computer system into volatile memory of the local computer system and transferring control of the local computer system thereto.

2. Computer apparatus for configuring and loading a BIOS image appropriate for effective use of a local computer system into volatile memory of the local computer system and comprising:

a first portion of BIOS resident in non-volatile memory in the local computer system and effective for responding to the energization of the local computer system by initiating a power on self test, a master boot record for the local computer system resident in non-volatile memory in a remote computer system and having an executable code segment, and a remaining portion of BIOS appropriate for effective use of the local computer system and resident in non-volatile memory in the remote computer system, said first portion of BIOS being effective on completion of the power on self test for calling for a transfer of said boot record from the remote computer system into volatile memory of the local computer system and for transferring control of the local computer system to the boot record, and said boot record being effective for recognizing the configuration of the local computer system, for calling for configuration and transfer of an image of said remaining portion of BIOS from the remote computer system into volatile memory of the local computer system, and for transferring control of the local computer system to the BIOS image transferred into the volatile memory of the local computer system which invokes delivery from the remote computer system of a program setting the configuration of the local computer system if appropriate.

3. Computer apparatus comprising, in combination:

a local computer for performing data processing and having a system processor and volatile memory and non-volatile memory, a remote computer for performing data processing and having a system processor and storage means capable of configuring and transferring BIOS appropriate for effective use of the local computer means from non-volatile storage of such BIOS, means for establishing operation communication between said local and remote computers, power on self test means stored in said non-volatile memory of said local computer, said power on self test means being responsive to energization of said local computer for initiating power on self test procedures performed by said local computer, and call in means stored in said non-volatile memory of said local computer, said call in means being responsive to completion of power on self test procedures by said local computer for calling for configuration and transfer of said BIOS into volatile memory of said local computer and of control of said local computer thereto.

4. Apparatus according to claim 3 wherein said local computer is a personal computer.

5. Apparatus according to one of claim 3 or claim 4 wherein said remote computer is a personal computer.

6. Apparatus according to claim 5 wherein said remote computer is operatively connected with the local computer to function as a file server.

7. Apparatus according to claim 5 wherein said remote computer is operatively connected with said local computer to function as a resource sharer.

8. Apparatus according to claim 5 wherein said remote computer is operatively connected with said local computer to function as a host computer.

9. Computer apparatus comprising:

a LAN station personal computer for performing data processing and having a system processor and volatile memory and non-volatile memory, and a first portion of BIOS resident in said non-volatile memory in said LAN station personal computer and effective for responding to the energization of said LAN station personal computer by initiating a power on self test and, on completion of the power on self test, for calling for a transfer of a second portion of BIOS from a remote computer system into said volatile memory of said LAN station personal computer and transferring control of said LAN station personal computer to the second portion of BIOS.

10. Computer apparatus comprising:

a computer for performing data processing and having a system processor and non-volatile memory, said computer being capable of configuring and transferring BIOS appropriate for effective use of a distinct local computer, a communication link operatively associated with said computer and effective for receiving from a distinct local computer a request for transfer to and storage in the volatile memory of the distinct local computer of the BIOS appropriate for effective use of the distinct local computer, and a master boot record assembly program operatively associated with said computer for responding to a request received by said communication link by determining the configuration required, configuring and transmitting the BIOS.

11. Apparatus according to claim 10 wherein said communication link is effective for operatively connecting said computer and a distinct local computer with said computer functioning as a file server.

12. Apparatus according to claim 10 wherein said communication link is effective for operatively connecting said computer and a distinct local computer with said computer functioning as a resource sharer.

13. Apparatus according to claim 10 wherein said communication link is effective for operatively connecting said computer and a distinct local computer with said computer functioning as a host.

14. Means for loading BIOS into a LAN station computer and comprising BIOS means for storage in non-volatile memory of a remote computer, power on self test means for storage in non-volatile memory of the LAN station computer, and call in means for storage in non-volatile memory of the LAN station computer, said power on self test means being responsive to energization of the LAN station computer for initiating power on self test procedures performed by the LAN station computer, said call in means being responsive to completion of power on self test procedures by the LAN station computer for calling for configuration and transfer of said BIOS means into volatile memory of the LAN station computer and of control of the LAN station computer thereto.

15. A method for loading BIOS into a local computer system which has a system processor and volatile memory and non-volatile memory, the method comprising the steps of:
   (a) responding to powering up of the local computer system by requesting from a memory location remote from the local computer system the transfer to and storage in the volatile memory of the local computer system of BIOS configured for effective use of the local computer system,
   (b) transferring and storing such BIOS, and
   (c) transferring control of the local computer system to such BIOS.

16. A method according to claim 15 further comprising the step of storing BIOS appropriate for effective use of the local computer system in non-volatile memory of a remote computer system.

17. A method according to one of claim 15 or claim 16 further comprising the step of storing, in non-volatile memory operatively coupled with the system processor of the local computer system, program instructions effective for requesting from a remote computer system a transfer of BIOS appropriate for effective use of the local computer system to the volatile memory of the local computer system.

18. A method according to one of claim 15 or claim 16 further comprising the step of coupling the local computer system with a remote computer system which has storage capability for non-volatile retention of BIOS.

19. A method according to claim 18 wherein the step of coupling comprises associating the local computer with a remote computer functioning as a file server.

20. A method according to claim 18 wherein the step of coupling comprises associating the local computer with a remote computer functioning as a resource sharer.

21. A method according to claim 18 wherein the step of coupling comprises associating the local computer with a remote computer functioning as a host.

22. A method for loading BIOS into a local personal computer system which has a system processor and volatile memory and non-volatile memory, the method comprising the steps of:
   polling with a remote computer system for discovering any request for procurement of BIOS by the local computer system,
   determining from any discovered request the configuration appropriate for any requesting local computer system,
   configuring with the remote computer system BIOS appropriate for effective use of the requesting local computer system,
   storing in the local computer system a BIOS configured by the remote computer system, and
   initializing the local computer system with the stored BIOS configured to be appropriate for effective use of the requesting local computer system.

23. A method for loading BIOS into a local personal computer system which has a system processor and volatile memory and non-volatile memory, the method comprising the steps of:
   coupling the local computer system with a remote personal computer system which has a direct access storage device capable of non-volatile retention of BIOS,
   storing BIOS appropriate for effective use of the local computer system in the direct access storage device of the remote computer system,
   storing, in memory operatively coupled with the system processor of the local computer system, program instructions effective for requesting from the remote computer system a transfer of BIOS appropriate for effective use of the local computer system to the volatile memory of the local computer system,
   sensing initialization of the local computer system,
   responding to initialization of the local computer system by transmitting from the local computer system the instructions effective for requesting from the remote computer system a transfer of BIOS,
   responding to receipt of the transmitted instructions requesting a transfer by transmitting BIOS from the remote computer system to the local computer system,
   storing the transmitted BIOS in the volatile memory of the local computer system, and
   transferring control of the local computer system to the BIOS stored in volatile memory.

24. A method for loading BIOS into a LAN station personal computer system which has a system processor and volatile memory and non-volatile memory, the method comprising the steps of:
   coupling the LAN station personal computer system with a remote personal computer system which has a direct access storage device capable of non-volatile retention of BIOS,
   storing BIOS appropriate for effective use of the LAN station personal computer system in the direct access storage device of the remote personal computer system,
   storing, in memory operatively coupled with the system processor of the LAN station personal computer system, program instructions effective for procuring from the remote personal computer system a transfer of BIOS appropriate for effective use of the LAN station personal computer system to the volatile memory of the LAN station personal computer system,
   sensing initialization of a power on self test of the LAN station personal computer system,
   responding to completion of a power on self test of the LAN station personal computer system by transmitting from the LAN station personal computer system the instructions effective for requesting from the remote personal computer system a transfer of BIOS,
   responding to receipt of the transmitted instructions requesting a transfer by transmitting BIOS from the remote personal computer system to the LAN station personal computer system,
   storing the transmitted BIOS in the volatile memory of the LAN station personal computer system, and
   transferring control of the LAN station personal computer system to the BIOS stored in volatile memory thereof.

25. A method according to claim 24 wherein the step of responding further comprises determining the configuration of BIOS appropriate to the requesting LAN station personal computer system.

26. A method according to claim 24 wherein the step of responding further comprises configuring the BIOS to be transmitted so as to be appropriate to the requesting LAN station personal computer system.

* * * * *